US012672710B1

(12) United States Patent
Joshi et al.

(10) Patent No.: US 12,672,710 B1
(45) Date of Patent: Jul. 7, 2026

(54) CARRYING APPARATUS WITH LOADING ELEMENT

(71) Applicants: Shailendra Joshi, Ho Ho Kus, NJ (US); Vidur Joshi, Ho Ho Kus, NJ (US)

(72) Inventors: Shailendra Joshi, Ho Ho Kus, NJ (US); Vidur Joshi, Ho Ho Kus, NJ (US)

( * ) Notice: Subject to any disclaimer, the term of this patent is extended or adjusted under 35 U.S.C. 154(b) by 870 days.

(21) Appl. No.: 18/083,891

(22) Filed: Dec. 19, 2022

(51) Int. Cl.
*B66D 3/18* (2006.01)
*A45F 3/04* (2006.01)
*A45F 3/10* (2006.01)
*A45F 3/14* (2006.01)

(52) U.S. Cl.
CPC .................. *A45F 3/14* (2013.01); *A45F 3/10* (2013.01); *A45F 2003/148* (2013.01); *B66D 3/18* (2013.01)

(58) Field of Classification Search
CPC ....... B66D 3/18; B25J 17/0266; B25J 9/1623; B66C 1/0256; B66C 11/16; B66C 23/48; A47C 12/00; A63B 2225/50
USPC .............................................. 254/270; 414/5
See application file for complete search history.

(56) References Cited

U.S. PATENT DOCUMENTS

| | | | | |
|---|---|---|---|---|
| 5,462,508 A * | 10/1995 | Schiavone | A63B 23/10 | 482/904 |
| 5,641,034 A * | 6/1997 | Calmeise | A47C 12/00 | 182/17 |
| 7,992,733 B2 * | 8/2011 | Laliberte | B66C 1/445 | 212/320 |
| 9,321,614 B2 * | 4/2016 | Moran | B66C 13/22 | |
| 2004/0063552 A1 * | 4/2004 | Sharps | A63B 21/225 | 482/100 |
| 2006/0226106 A1 * | 10/2006 | Zaguroli | B66C 9/14 | 212/331 |

* cited by examiner

*Primary Examiner* — Mahdi H Nejad
(74) *Attorney, Agent, or Firm* — Gulf Coast Intellectual Property Group

(57) ABSTRACT

A carrying apparatus configured to assist a user to carry a heavy load above their head wherein the present invention provides weight distribution to the shoulders of the individual. The invention includes a carrying apparatus having a first lateral support member and a second lateral support member having a support platform member secured therebetween. The first lateral support member and second lateral support member have lower edges configured to be placed on the shoulders of the user of the carrying apparatus. The carrying apparatus is configured to have a load placed thereon by the loading member. The loading member includes a frame having a bottom support section, vertical section and upper arm member configured to facilitate placement of a load onto the carrying apparatus that is disposed on a user's shoulder. A cable and pulley system are employed to operate a loading platform in order to load the carrying apparatus.

9 Claims, 4 Drawing Sheets

CARRYING APPARATUS WITH LOADING ELEMENT

FIELD OF INVENTION

The present invention relates generally to devices configured to assist an individual carry various objects, more specifically but not by way of limitation, a carrying apparatus that is configured to be mounted to a user's shoulder wherein the apparatus of the present invention extends over the user's head and has a support platform member that is configured to have objects superposed thereto.

BACKGROUND

Most individuals will be required to carry an object or a various item either routinely or sporadically throughout their life. Whether for work or for personal needs, individuals routinely find themselves having to carry objects from one location to another. By way of example but not limitation individuals routinely carry groceries from an automobile to the inside of their homes. Construction workers will routine carry various tools and objects around a job site. For the latter there are tools such as but not limited to wheelbarrows and other apparatus that can assist a user in transporting a load of material or an object. Additionally, it is well known that automated equipment can be employed in some environments and for some materials and/or objects.

In various parts of the world, it is still very common for individuals to carry objects and materials manually sometimes for a significant distance. It is quite common for people to place an object on top of their head wherein the individual carrying the object or materials will lift the object/material over their head and obtain a balance of the load on top of their head prior to proceeding to walk with the load. While this method has proven effective for many years, there are risks associated therewith. Placing a load on top of an individual's head can result in an unhealthy amount of force on the user's neck potentially resulting in injury to either the head and/or neck. Furthermore, it can be quite common for a user to injure themselves as they attempt to lift up the load in order to place the load on top of their head. Heavy loads make this motion quite dangerous and can result in injury to the head, neck or shoulder area.

It is intended within the scope of the present invention to provide a carrying apparatus with a loading element that is configured to facilitate a user carrying an object over their head wherein the present invention provides load distribution to the shoulders of the user. Furthermore, a loading element is provided in order to assist the user in placing a load on the carrying apparatus.

SUMMARY OF THE INVENTION

It is the object of the present invention to provide a carrying apparatus that is configured to be placed on a user's shoulders and assist the user in carrying a load above their head wherein the present invention includes a body having a first lateral support member and a second lateral support member.

Another object of the present invention is to provide an apparatus configured to assist a user carry a load above their head and distribute the weight thereof to the shoulders wherein the body includes a support platform member intermediate the first lateral support member and the second lateral support member.

A further object of the present invention is to provide a carrying apparatus that is configured to be placed on a user's shoulders and assist the user in carrying a load above their head wherein the lower end of the first lateral support member and second lateral support member include a void.

Still another object of the present invention is to provide an apparatus configured to assist a user carry a load above their head and distribute the weight thereof to the shoulders wherein the void of the first lateral support member and the second lateral support member has an arcuate perimeter edge.

An additional object of the present invention is to provide a carrying apparatus that is configured to be placed on a user's shoulders and assist the user in carrying a load above their head wherein the support platform member includes a hole bored therethrough.

Yet a further object of the present invention is to provide an apparatus configured to assist a user carry a load above their head and distribute the weight thereof to the shoulders wherein the loading element of the present invention includes a support frame.

Another object of the present invention is to provide a carrying apparatus that is configured to be placed on a user's shoulders and assist the user in carrying a load above their head wherein the loading element of the present invention includes a loading member that is movably secured to the frame.

An alternate object of the present invention is to provide an apparatus configured to assist a user carry a load above their head and distribute the weight thereof to the shoulders wherein the loading member is secured to a cable system wherein the cable system can include a counterweight.

Still a further object of the present invention is to provide a carrying apparatus that is configured to be placed on a user's shoulders and assist the user in carrying a load above their head wherein the user of the present invention can operate the loading element in order to facilitate placing a load on the carrying apparatus placed on the user's shoulders.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
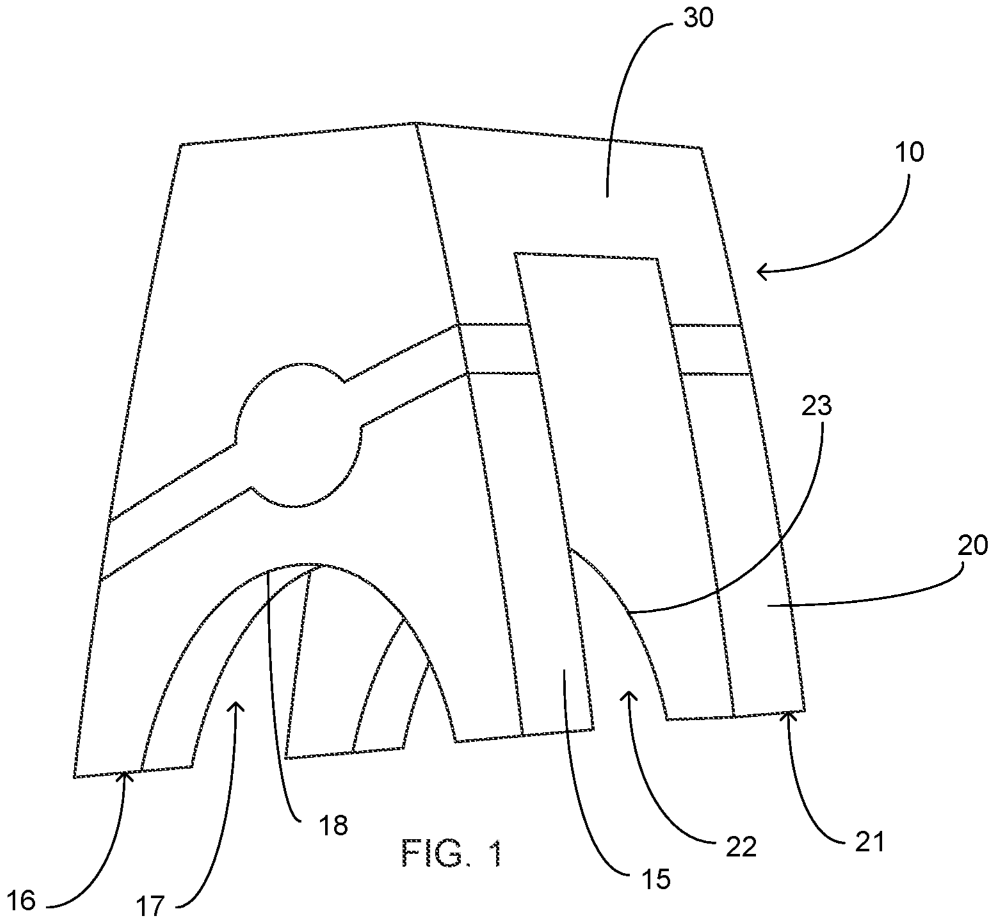
FIG. 1 is a side perspective view of the carrying apparatus of the present invention.
Figure 2:
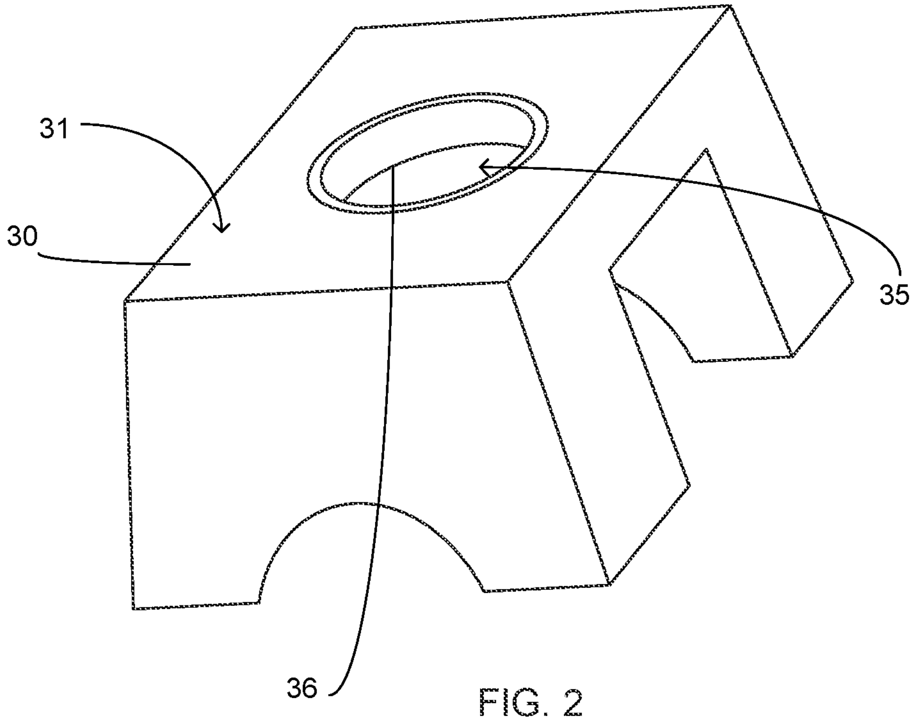
FIG. 2 is a top perspective view of the carrying apparatus of the present invention.

Referring now to the drawings submitted herewith, wherein various elements depicted therein are not necessarily drawn to scale and wherein through the views and figures like elements are referenced with identical reference numerals, there is illustrated a carrying apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Now referring to the Figures submitted as a part hereof, the carrying apparatus 100 includes a body 10 wherein the body 10 is configured to be placed on a user's shoulders so as to assist a user in carrying an exemplary load 99. The body 10 includes a first lateral support member 15 and a second lateral support member 20 that are vertical in orientation and extend upward from a user's shoulders. The first lateral support member 15 includes lower edge 16 wherein the lower edge 16 includes a portion thereof having a void 17 with an arcuate perimeter 18. The void 17 and arcuate perimeter 18 are designed so as to be superposed a user's shoulder and mateably accommodate the shoulder within the void 17. It is contemplated within the scope of the present invention that the radius of the arcuate perimeter 18 could vary in order to provide a more secure fit for individuals of different sizes.

The second lateral support member 20 is parallel to the first lateral support member 15 as is illustrated herein. The second lateral support member 20 is constructed similarly to the first lateral support member 15 having a lower edge 21, void 22 and arcuate perimeter 23 thereof. The second lateral support member 20 is operable to mateably reside on the opposing shoulder from the shoulder on which the first lateral support member 15 resides. It is contemplated within the scope of the present invention that the first lateral support member 15 and second lateral support member 20 could be manufactured in alternate heights so as to accommodate various sizes of users.

Secured to the upper edges of the first lateral support member 15 and second lateral support member 20 is the support platform member 30. The support platform member 30 is intermediate the first lateral support member 15 and second lateral support member 20 being perpendicular thereto. The support platform member 30 has a level upper surface 31 so as to receive objects thereon. A center aperture 35 is present in the support platform member 30 approximately in the middle thereof. The center aperture 35 is annular in shape and is formed utilizing suitable durable techniques. The center aperture 35 provides two functions in the preferred embodiment of the carrying apparatus 100. First, the lower edge 36 of the center aperture 35 is positioned such that the crown of the user's head slightly egresses therepast when the carrying apparatus 100 is in position on a user. The position of the crown of the head to the lower edge 36 of the center aperture 35 provides added stability of the carrying apparatus 100 when in use. Additionally, is the user is carrying a vessel or other object that may have an annular bottom, the center aperture 35 can mateably engage with that portion of the vessel so as to facilitate a more stable position during transport thereof. It is contemplated within the scope of the present invention that the center aperture 35 could be provided in alternate sizes and shapes.

The carrying apparatus 100 further includes a loading member 50. The loading member 50 facilitates placing the exemplary load 99 onto the support platform member 30 of the body 10. The loading member 50 includes a bottom support section 60 configured with opposing lateral support members 61,62 and a rear support member 63. The opposing lateral support members 61,62 are parallel in orientation with the rear support member 63 being operably coupled intermediate the opposing lateral support members 61,62 and perpendicular thereto. In a preferred embodiment the bottom support section 60 is u-shaped so as to create space 95 in which the space 95 is sufficient in size for a user to stand during placement of the load 99. It should be understood within the scope of the present invention that the bottom support section 60 could be manufactured in alternate configurations and achieve the desired objective discussed herein.

Extending upward from the bottom support section 60 is post support member 70. Post support member 70 is perpendicular to the bottom support section 60 and vertical in orientation. It should be understood within the scope of the present invention that the post support member 70 could be provided in alternate heights so as to ensure the loading element is sufficient in height for a user to place a load 99 onto the carrying apparatus 100. Extending outward from the upper end 72 of the post support member 70 being perpendicular thereto is the upper arm member 75. The upper arm member 75 is coupled to the post support member 70 utilizing suitable durable techniques. Upper arm member 75 extends outward from the post support member 70 so as to be disposed over the space 95. While not particularly illustrated herein, it is contemplated within the scope of the present invention that the loading member 50 could be configured so as to be foldable. Those skilled in the art should recognize that the loading member 50 could be configured with various mechanical hinges and/or other elements in order to facilitate an ability to fold the loading member 50 when not in use.

Figure 5:
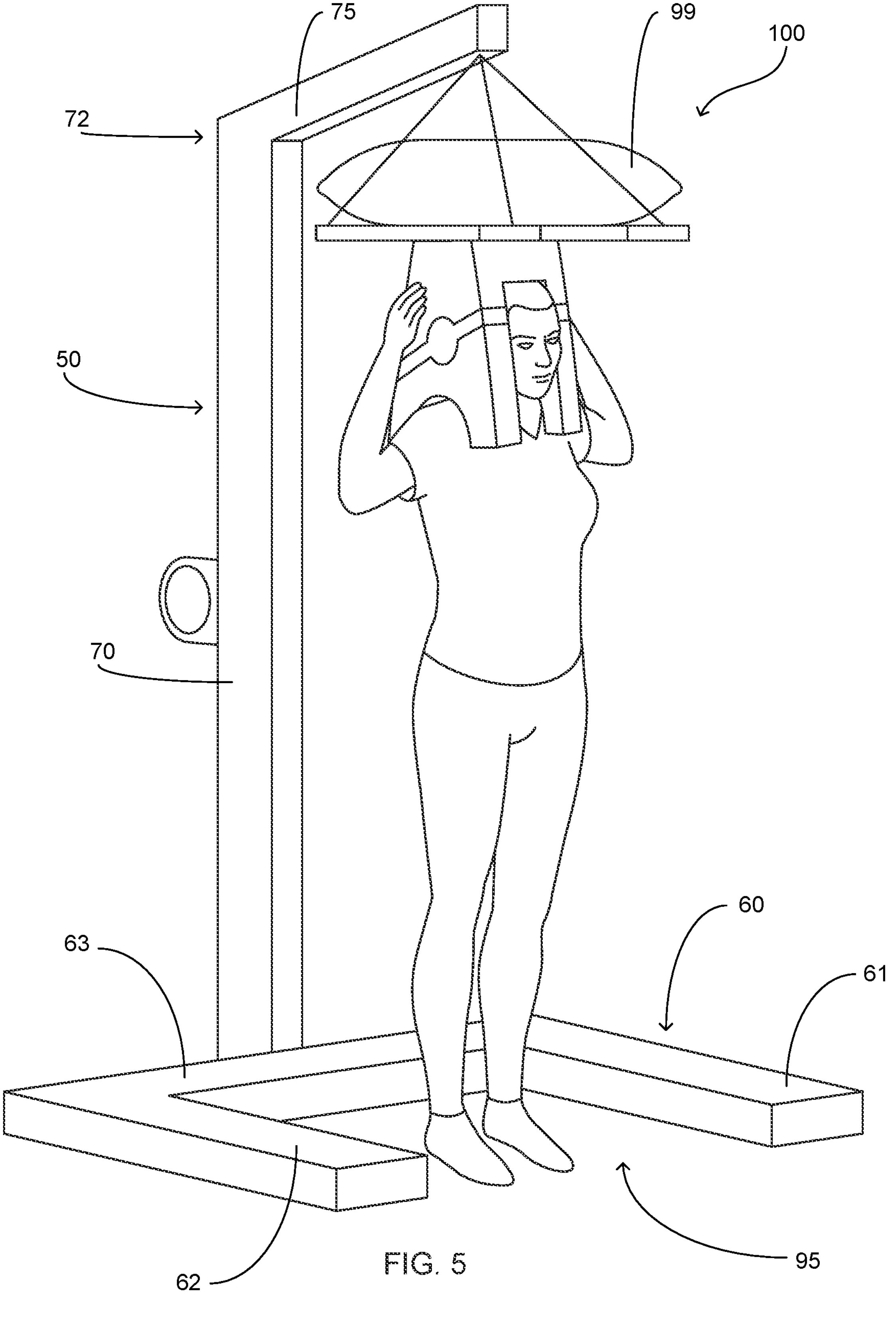
FIG. 5 is a perspective view of the carrying apparatus in operation with the loading element of the present invention.
Figure 6:
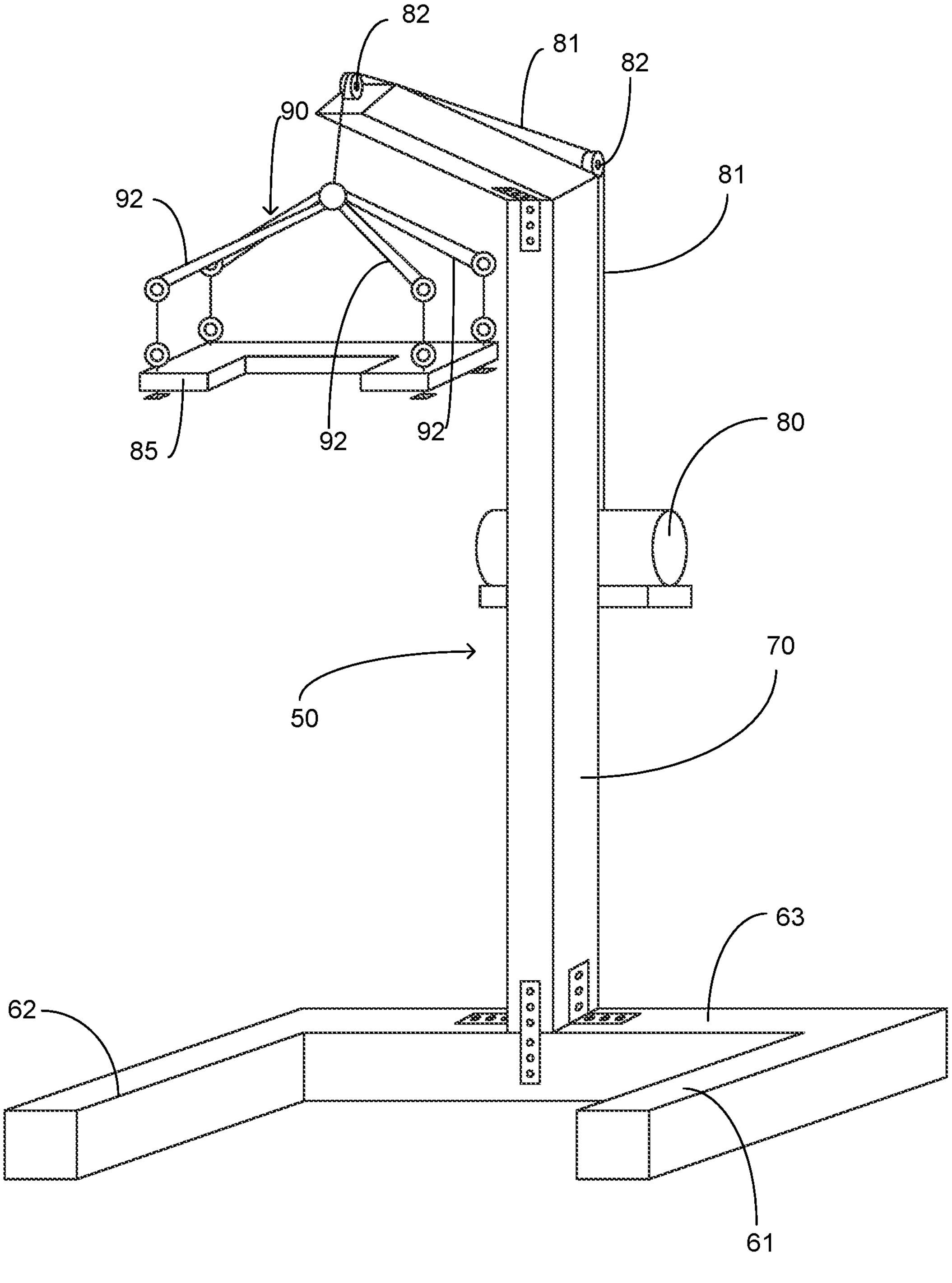
FIG. 6 is a perspective view of an embodiment of the loading element of the present invention.

It is contemplated within the scope of the present invention that the loading member 50 could be configured to operate either manually or with automation wherein for either embodiment the user has access to controls so as to facilitate single user functionality. The embodiment illustrated herein in FIGS. 5 and 6 is a contemplated manual embodiment that includes counterweight 80, cables 81 and pulleys 82 that are operably coupled to loading platform 85. It is contemplated within the scope of the present invention that the present invention could include various configurations of pulleys 82, cables 81 and counterweight 80 in order to achieve the objective of moving the loading platform 85 between its first and second position. In this configuration, the counterweight has sufficient mass to lift the loading platform 85 to its second position wherein in the second position the loading platform 85 is proximate upper arm member 75. Loading platform 85 is operably coupled to cable 81 via spreader assembly 90. The spreader assembly 90 includes support arm members 92 that are centrally coupled at union 93 and are distributed to each corner of the loading platform 85. The spreader assembly 90 maintains a level orientation of the loading platform ensuing a load 99 being placed thereon. It is contemplated within the scope of the present invention that the spreader assembly 90 could be constructed in alternate configurations and achieve the desired objective discussed herein.

While not particularly illustrated herein, it is contemplated within the scope of the present invention that the loading member 50 could include either manual or automated elements that provide control of the levels of the loading platform 85 intermediate its first and second position. This would provide locations intermediate its first location, located adjacent the ground on which the loading element is superposed, and the second location wherein the loading platform 85 is adjacent the upper arm member 75. Elements such as but not limited to spring-loaded pins, mechanical stops and a stepper motor could be employed to achieve the desired objective of suspending the loading platform 85 at any point intermediate the first position and second position thereof.

Figure 3:
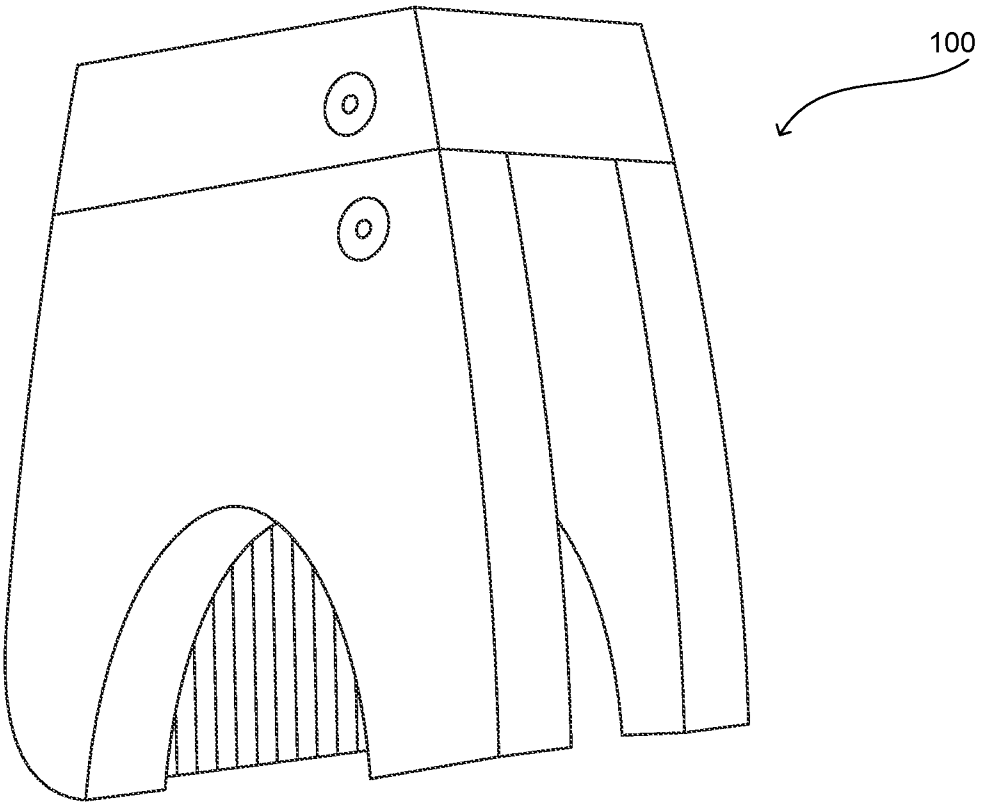
FIG. 3 is a side perspective view of an alternate embodiment of the carrying apparatus of the present invention.
Figure 4:
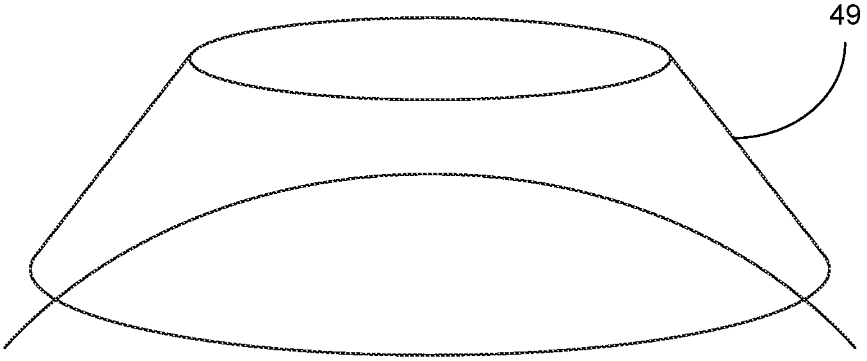
FIG. 4 is a perspective view of a base support member for the alternate embodiment of the present invention.

In FIGS. 3 and 4 submitted herewith an alternative embodiment of the carrying apparatus 100 is illustrated therein. This embodiment is manufactured from a dense Styrofoam having an external plastic wrap so as to maintain structural rigidity under load. Support base 49 is configured to mateably couple therewith during use. Another contemplated embodiment provides for the carrying apparatus 100 to have an inflatable body 10 wherein the body 10 is manufactured to have a high pressure inflatable body capable of support loads up to fifty kilograms. It is further contemplated within the scope of the present invention that the inflatable embodiment could include internal tubing and/or alternate elements operable to assist maintaining of the shape thereof during support of the load 99.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding description is, therefore, not intended to be limited to the specific forms set forth herein, but on the contrary, it is intended to cover such alternatives, modifications, and equivalents, as can be reasonably included within the spirit and scope of the invention.

What is claimed is:

1. A carrying apparatus configured to be superposed a user's shoulders and facilitate transportation of a load by the user wherein the carrying apparatus comprises:

a body, said body having a first lateral support member and a second lateral support member, said first lateral support member having a lower edge configured to be superposed a first shoulder of the user, wherein said lower edge of said first lateral support member includes an arcuate portion, said arcuate portion forming a void, said void configured to mateably superposed a first shoulder area of the user, said second lateral support member having a lower edge configured to be superposed a second shoulder of the user, wherein said lower edge of said second lateral support member includes an arcuate portion, said arcuate portion of said lower edge of said second lateral support member forming a void, said void of said lower edge of said second lateral support member configured to mateably superposed a second shoulder area of the user, said body further having a support platform member, said support platform member being intermediate said first lateral support member and said second lateral support member, said support platform member being horizontal in orientation, said support platform member being at an upper end of said body, said support platform member having an upper surface operable to have the load superposed thereon, wherein said support platform member further includes an aperture, said aperture being annular in shape and located in a center of the support platform member, said aperture being journaled through said support platform member;

a loading member, said loading member having a frame, said loading member operable to assist the user in placing the load onto said upper surface of said support platform member, wherein said loading member further includes a plurality of pulleys and at least one cable, said plurality of pulleys and at least one cable operably coupled to a loading platform, said loading platform configured to have the load superposed thereon so as to transfer to the support platform member of said body; and wherein the carrying apparatus is configured to be superposed the user's shoulders and wherein the support platform member is above a head of the user and extending thereacross.

2. The carrying apparatus configured to be superposed the user's shoulders and facilitate transportation of the load as recited in claim 1, and further including a spreader assembly, said spreader assembly being operably coupled to said at least one cable and said loading platform.

3. The carrying apparatus configured to be superposed the user's shoulders and facilitate transportation of the load as recited in claim 2, and further including a counterweight, said counterweight being operably coupled to said loading platform via said at least one cable, said counterweight configured to move said loading platform between a first position and a second position.

4. The carrying apparatus configured to be superposed the user's shoulders and facilitate transportation of the load as recited in claim 3, wherein in said first position of said loading platform, said loading platform is adjacent a ground on which the loading member is superposed.

5. The carrying apparatus configured to be superposed the user's shoulders and facilitate transportation of the load as recited in claim 4, wherein in said second position of said loading platform, said loading platform is adjacent an upper arm member of said loading member.

6. The carrying apparatus configured to be superposed the user's shoulders and facilitate transportation of the load as recited in claim 5, wherein said loading member includes a bottom support section, said bottom support section being superposed the ground, said bottom support section having opposing lateral support members and a rear support member contiguously formed, said bottom support section having a space wherein the space is of suitable size to accommodate the user.

7. The carrying apparatus configured to be superposed the user's shoulders and facilitate transportation of the load as recited in claim 6, wherein said loading member includes a post support member, said post support member having a lower end and an upper end, said post support member being coupled to said rear support member of said bottom support section, said post support member extending upward from said bottom support section being perpendicular thereto.

8. The carrying apparatus configured to be superposed the user's shoulders and facilitate transportation of the load as recited in claim 7, wherein said upper arm member is aligned over said space of said bottom support section.

9. The carrying apparatus configured to be superposed the user's shoulders and facilitate transportation of the load as recited in claim 8, wherein said frame of said loading member is configured to be foldable.

* * * * *